(12) United States Patent
Berge et al.

(10) Patent No.: US 11,488,571 B2
(45) Date of Patent: Nov. 1, 2022

(54) ANTI-EAVESDROP SECURITY DEVICE

(71) Applicant: International Business Machines Corporation, Armonk, NY (US)

(72) Inventors: Layne A. Berge, Rochester, MN (US); Jason J. Bjorgaard, Rochester, MN (US); John R. Dangler, Rochester, MN (US); Matthew Doyle, Chatfield, MN (US); Thomas W. Liang, Rochester, MN (US); Kyle Schoneck, Rochester, MN (US); Matthew A. Walther, Rochester, MN (US); Jeffrey N. Judd, Oronoco, MN (US); Henry Michael Newshutz, Rochester, MN (US); Matthew S Kelly, Oakville (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/919,864

(22) Filed: Jul. 2, 2020

(65) Prior Publication Data
US 2022/0005449 A1  Jan. 6, 2022

(51) Int. Cl.
*G10K 11/175* (2006.01)
*H04R 1/10* (2006.01)
*H04M 1/02* (2006.01)

(52) U.S. Cl.
CPC ........... *G10K 11/1754* (2020.05); *H04R 1/10* (2013.01); *H04M 1/0202* (2013.01)

(58) Field of Classification Search
CPC .... G10K 11/1754; H04R 1/10; H04M 1/0202
See application file for complete search history.

(56) References Cited

U.S. PATENT DOCUMENTS

| 9,747,884 | B2 | 8/2017 | Lehmann |
| 10,021,228 | B2 | 7/2018 | Ageishi |
| 10,057,395 | B1 | 8/2018 | Wagstaff et al. |
| 2015/0236743 | A1 | 8/2015 | Kennedy |
| 2019/0377381 | A1* | 12/2019 | Tuttle ............... G06F 1/1647 |
| 2020/0228897 | A1* | 7/2020 | Choi .................. H04R 3/00 |
| 2020/0260183 | A1* | 8/2020 | Stachura ............ H04K 3/46 |

FOREIGN PATENT DOCUMENTS

CN        207720354 U     8/2018

OTHER PUBLICATIONS

"Microphone Blocker", Wikipedia, Apr. 12, 2020 (Year: 2020).*
(Continued)

*Primary Examiner* — David L Ton
(74) *Attorney, Agent, or Firm* — Nathan M. Ran

(57) ABSTRACT

A system and method to prevent eavesdropping by a device. An anti-eavesdrop component is installed on the device. The anti-eavesdrop component is configured to actively prevent the device from capturing audio from the environment. In response to installing the anti-eavesdrop component, the device recognizes the anti-eavesdrop component as a primary audio input for the device. The anti-eavesdrop component then proceeds to block the device from capturing outside audio by injecting noise or otherwise interfering with the primary audio input.

17 Claims, 3 Drawing Sheets

(56) References Cited

OTHER PUBLICATIONS

Vysk | QS1 Quantum Security Case, https://www.vysk.com/technology/qs1, Printed: Nov. 26, 2019, 3 pages.
Anti-Surveillance | Privoro, https://privoro.com/anti-surveillance, Printed: Nov. 26, 2019, 3 pages.
Curiosity Staff, "Sounds That Mies Can Hear And Humans Can't Could Protect You From Electronic Eavesdropping," Jul. 30, 2017, 5 pages. https://curiosity.com/topics/sounds-that-mics-can-hear-and-humans-cant-could-protect-you-from-electronic-eavesdropping-curiosity/.
Mic-Lock Microphone Blocker, https://www.amazon.com/Mic-Lock-Microphone-Blocker-Pack-Surveillance/dp/B076CSLB5H/ref=asc_df_B076CSLB5H/, Printed: Nov. 26, 2019, 7 pages.
My MIC Audio Blocker, https://www.amazon.com/My-MIC-Audio-Blocker-Computers/dp/B07CZ12WKL/ref=asc_df_B07CZ12WKU, Printed: Nov. 26, 2019, 6 pages.
Nope Sound—Microphone Blocker, Bungajungle, Printed: Nov. 26, 2019, 3 pages. https://www.bungajungle.com/products/nope-microphone-blocker?variant=37981010117.
Beck, K., "Taping over your computer microphone does nothing—here's what to do instead," Mashable, Jun. 22, 2016, 1 page, https://mashable.com/2016/06/22/computer-microphone-hack/#4llvcGSOCkq3.
Huang et al. "Against the Law: Countering Lawful Abuses of Digital Surveillance," Political Science, Jul. 2016, 16 pages, Semantic Scholar. DOI:10.21428/12268.

\* cited by examiner

ANTI-EAVESDROP SECURITY DEVICE

BACKGROUND

The present disclosure relates to preventing or limiting the ability for a device to eavesdrop on communications occurring around the device when the user is not using the device.

Electronic snooping or surveillance occurs through many devices that consumers have is fairly common. Many devices are actively listening for audio input from the user to enable particular features of the device. As the device is waiting for a specific audio input the device is constantly listening and capturing audio from the surrounding environment. This captured audio can be used by the device for legitimate purposes or for illicit purposes.

SUMMARY

Embodiments are directed to a system and method to prevent eavesdropping by a device. An anti-eavesdrop component is installed on the device. The anti-eavesdrop component is configured to actively prevent the device from capturing audio from the environment. In response to installing the anti-eavesdrop component, the device recognizes the anti-eavesdrop component as a primary audio input for the device. The anti-eavesdrop component then proceeds to block the device from capturing outside audio by injecting noise or otherwise interfering with the primary audio input.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
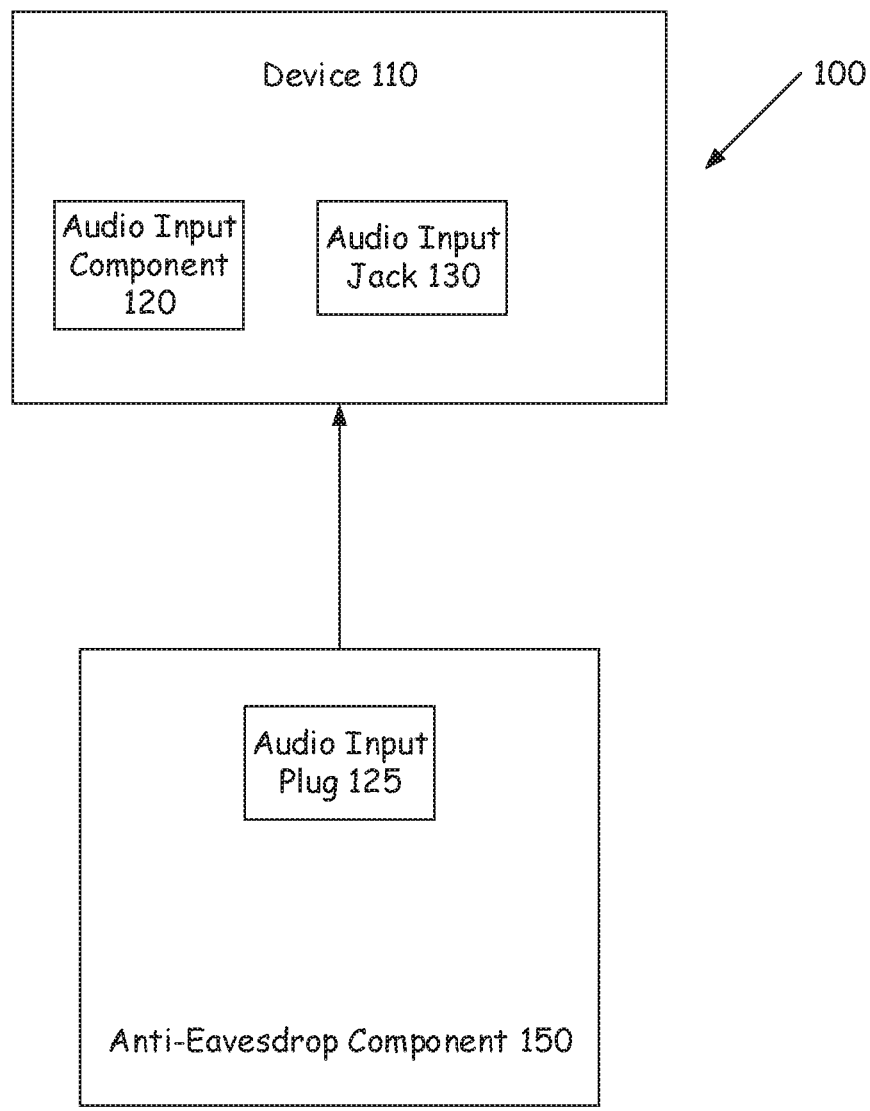
FIG. 1 is a block diagram illustrating an anti-eavesdropping system according to one illustrative embodiment.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to preventing or limiting the ability for a device to eavesdrop on communications occurring around the device when the user is not using the device. While the present disclosure is not necessarily limited to such applications, various aspects of the disclosure may be appreciated through a discussion of various examples using this context.

The advent of and the number of smart devices has increased the likelihood that one of these devices is either actively or passively listening to the surrounding environment. Electronic snooping or surveillance through these devices is fairly common. Many devices are actively listening for audio input from the user to enable particular features of the device. As they are waiting for a specific audio input the device is constantly listening and capturing audio. This captured audio can be used for legitimate purposes or for illicit purposes. Regardless of the reason for capturing this data, a user may not want this data captured and used by others. For example, the audio data may contain confidential or sensitive information that the user does not want or is not permitted to share with any other source. Some devices are passively listening to the environment. This passive listening can be used to make, for example, recommendations to the user when the user visits a website that has a link to the profile of the user's device. While this information that is passively obtained can be useful to the user, there are instances where this information may not be something the user desires to share.

FIG. 1 is a block diagram illustrating an anti-eavesdropping system according to embodiments of the present disclosure. The system includes a device 110 and an anti eavesdrop component 150.

The device 110 is a component of the system that includes the capability to capture audio from the surrounding environment. The device 110 can be a mobile phone, a laptop computer, a desktop computer, a tablet computer, a television, a smart speaker, etc. The device 110 in some embodiments includes at least one audio input component. For example, the audio input component 120 is a microphone that captures audio from the surrounding environment. In some embodiments, the audio input component 120 is an audio input jack 130 that allows the device 110 to receive audio input from an external microphone through the audio input jack. In some embodiments the audio input component 120 is a microphone that is attached to an external headphone that connects to the device 110 wireless, such as through a Bluetooth connection.

The anti-eavesdrop component 150 is a component of the system that is designed and configured to prevent the device 110 from capturing audio signals from the surrounding environment. The component prevents the device 110 from capturing the audio signals by applying "noise" to at least one audio input of the device 110. In some embodiments the noise is white noise that is provided as audio input to the device 110 from the component through the use of a white noise generator. However, in some embodiments, the noise is random noises, such as meaningless words, music, or other audio input sounds. These sounds are provided to the device 110 from the component in a non-audible way. That is the noise is not able to be heard by anything other than the device 110. In this way, the user is able to continue using the device 110, other equipment, continue conversations, etc., without interference from the component. The noise can be generated using any approach for generating audio input signals artificially. In some embodiments the component causes a short between a microphone pin and a ground pin of an audio input jack 130 of the device 110. In this way the short prevents the device 110 from obtaining any audio through the microphone.

The component is in one embodiment configured with an audio input plug 125 to interact with an audio input jack 130 of the device 110. The audio input plug 125 allows the component to directly provide the noise to the device 110. The plug is inserted into the audio input jack 130 and during the act of insertion, the device 110 reacts by turning off any internal microphone of the device 110. Thus, the only audio input is through the audio input jack 130. However, in some embodiments, the device 110 may not turn off the internal microphone. In those instances the anti-eavesdrop component 150 can provide a notification to the user that the internal microphone is active. This can be by providing a notification on an associated application on the device 110, flashing lights on the anti-eavesdrop component 150, changing colors of lights on the anti-eavesdrop component 150, etc.

In some embodiments the anti eavesdrop component 150 is integrated into other devices that are used by the user. For example, the anti-eavesdrop component 150 can be incorporated into headphones used by the user to listen or interact with the device 110. In some embodiments the anti-eavesdrop component 150 is a smartphone/mobile phone case. The anti-eavesdrop component 150 can include a feature that allows the user to activate the blocking features. For example the user can press a button the component that activates/deactivates the blocking feature. When the feature is activated, the component provides the blocking features to the device 110. When the user desires to deactivate the feature, the user can, for example, turn off the feature by pressing the same button that was used to activate the blocking feature. In some embodiments, the component can react to a "wake word" that causes the anti-eavesdrop component 150 to understand that the user wishes to communicate with the device 110. In response the component can turn off the blocking feature.

Figure 2:
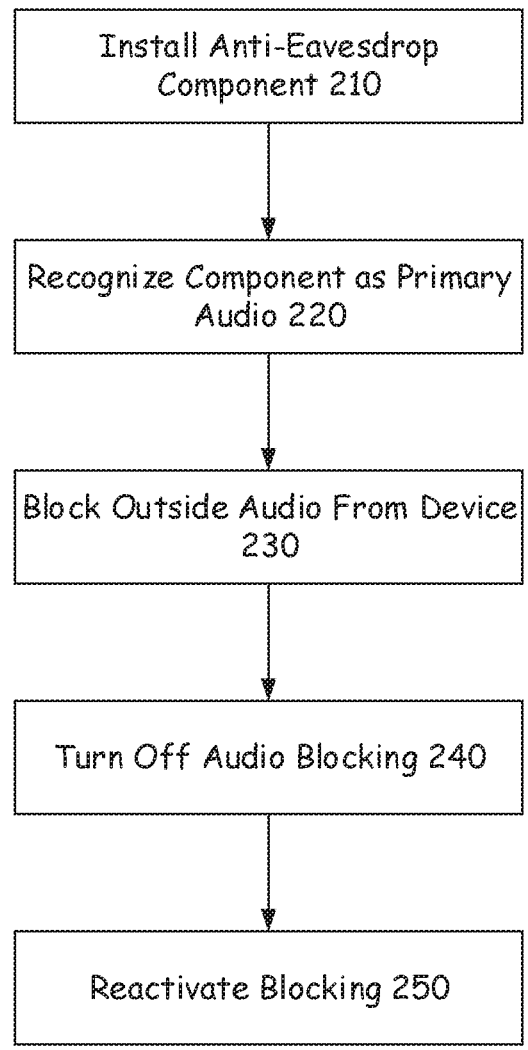
FIG. 2 is a flow diagram illustrating a process for using the anti-eavesdrop component according to illustrative embodiments.

FIG. 2 is a flow diagram illustrating a process for using the anti-eavesdrop component 150 according to embodiments. The process begins by the user installing the component. This is illustrated at step 210. To install the component into the device 110, the user can plug the component into the audio input jack 130 of the device 110. In some embodiments, the installation is achieved by the user pairing the component with the device 110. For example, the user can pair a wireless headset that includes the component with the device 110.

The installation of the component into the audio input jack 130 of the device 110 causes the device 110 to recognize the component as the primary audio input for the device 110. This is illustrated at step 220. The device 110 then turns off all other audio inputs that are present on the device 110, such that the only audio input that is recognized by the device 110 comes from the component. In some embodiments the device 110, can leave other audio inputs active, such as an internal microphone. This enables that the device 110 can receive or recognize audio input through the additional audio inputs. In instances where the device 110 leaves other audio the component can through the use of the software module programmatically turn off the additional audio inputs of the device 110. If the component is unable to turn off the additional audio inputs the component can provide a notification to the user that there are audio inputs active that are capable of possibly capturing audio from the user despite the installation of the component. The user can respond to this notification by attempting to turn off these additional audio inputs manually through functions provided by the manufacturer of the device 110. For example, the user can navigate through a series of menus to turn off those additional audio inputs.

Once installed on or with the device 110, the component proceeds to provide audio input to the device 110 and/or otherwise prevent the transmission of outside audio to the device 110. This is illustrated at step 230. The component can input white noise into the device 110 through the audio input jack. This white noise is provided to the device 110 in a manner that is not audible to the user of the device 110. The component can provide the white noise to the device 110 at a volume sufficient that any additional audio, such as the user speaking, is not discernable by device 110 through any monitoring software that is present on the device 110. In some embodiments, instead of white noise the component inputs meaningless input to the device 110. In some embodiments, to prevent eavesdropping on communications that are occurring through the device 110, such as a phone conversation, the component can transmit the audio signals associated with the conversation to the device 110 in a non-audio format, such as a data stream to a communications application that provides a secure link between the component and the application which bypasses the audio input of the device 110.

When the user desires to interact with features of the device 110 that require access the user needs to remove or turn off the features of the component. This is illustrated at step 240. The user can simply unplug or unpair the component from the device 110. The removal of the device 110 causes the audio input to become available to the device 110 such that device 110 can receive and interpret audio input from the user. In some embodiments the user can turn off the audio blocking features of the component without removing or unpairing the component from the device 110. For example, the user can use a wake word to cause the component to turn off its audio blocking features. If the component is connected with an Amazon Alexa device 110 (by Amazon Corporation of Seattle Wash.), the user can use the wake word "Alexa" to communicate with the device 110. However, as the device 110 is connected to the component the device 110 will not hear or react to the wake word. However, the component can recognize the wake word. In response to receiving the wake word, the component can turn off its audio blocking features. This can include, for example, stopping providing of white noise through the audio input. The component can provide an indication that the blocking features of the component are no longer active. The user would then say the wake word again to interact with device 110. It should be noted that the first wake word (the word that turns off the component) does not have to be the same as the second wake word, (the word that wakes the device 110).

Once the user has completed their desired interactions with the device 110 the component can be reactivated. This is illustrated at step 250. The user can re-pair the component or can reinsert the component into the audio input jack 130 to reactive the audio blocking features of the component. In some embodiments, the user can press a button on the component to reactivate the features. In some embodiments, the component can automatically reactivate the features. The component can reactivate after a predetermined period of time of no interaction from the user with the device 110. Alternatively, the component can reactivate after a predetermine period of time regardless of the user's interaction with the device 110. For example, the component can reactivate after 5 minutes of deactivation. However, any time period can be used. Similarly, when interaction with the device 110 is used as the standard, the component can reactivate after 1 minute of no interaction with the device 110. Again, any time period can be used to reactivate the component. These time periods can be adjusted or selected by the user. Once reactivated, the audio blocking features of the component resumes and the user is protected from any eaves dropping by the device 110.

Figure 3:
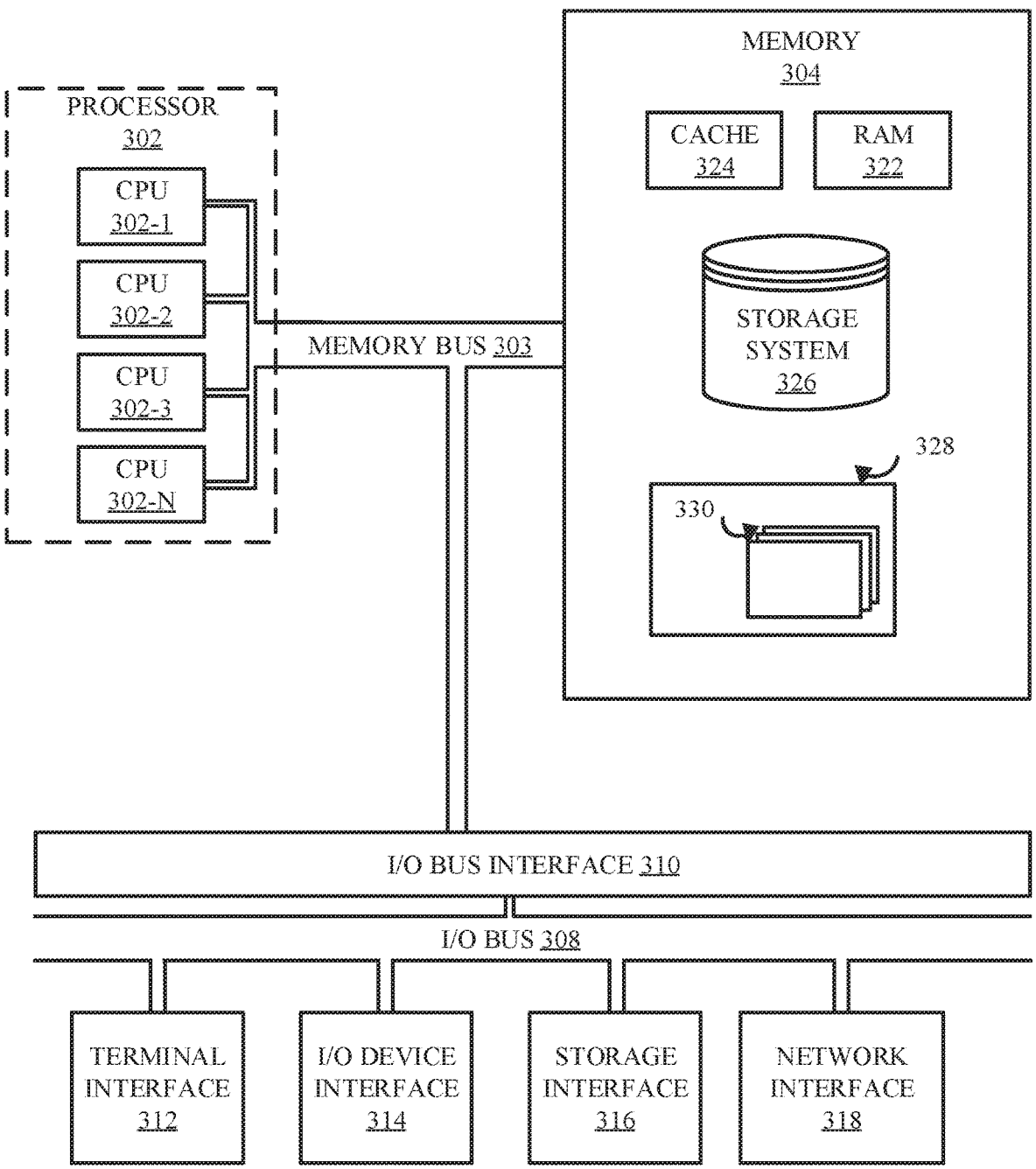
FIG. 3 is a block diagram illustrating a computing system according to one embodiment.

Referring now to FIG. 3, shown is a high-level block diagram of an example computer system 301 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 301 may comprise one or more CPUs 302, a memory subsystem 304, a terminal interface 312, a storage interface 316, an I/O (Input/Output) device interface 314, and a network interface 318, all of which may be communicatively coupled, directly or indirectly, for inter-component communication via a memory bus 303, an I/O bus 308, and an I/O bus interface unit 310.

The computer system 301 may contain one or more general-purpose programmable central processing units (CPUs) 302A, 302B, 302C, and 302D, herein generically referred to as the CPU 302. In some embodiments, the computer system 301 may contain multiple processors typical of a relatively large system; however, in other embodiments the computer system 301 may alternatively be a single CPU system. Each CPU 302 may execute instructions stored in the memory subsystem 304 and may include one or more levels of on-board cache.

System memory 304 may include computer system readable media in the form of volatile memory, such as random access memory (RAM) 322 or cache memory 324. Computer system 301 may further include other removable/non-removable, volatile/non-volatile computer system storage media. By way of example only, storage system 326 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 304 can include flash memory, e.g., a flash memory stick drive or a flash drive. Memory devices can be connected to memory bus 303 by one or more data media interfaces. The memory 304 may include at least one program product having a set (e.g., at least one) of program modules that are configured to carry out the functions of various embodiments.

Although the memory bus 303 is shown in FIG. 3 as a single bus structure providing a direct communication path among the CPUs 302, the memory subsystem 304, and the I/O bus interface 310, the memory bus 303 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 310 and the I/O bus 308 are shown as single respective units, the computer system 301 may, in some embodiments, contain multiple I/O bus interface units 310, multiple I/O buses 308, or both. Further, while multiple I/O interface units are shown, which separate the I/O bus 308 from various communications paths running to the various I/O devices, in other embodiments some or all of the I/O devices may be connected directly to one or more system I/O buses.

In some embodiments, the computer system 301 may be a multi-user mainframe computer system, a single-user system, or a server computer or similar device that has little or no direct user interface, but receives requests from other computer systems (clients). Further, in some embodiments, the computer system 301 may be implemented as a desktop computer, portable computer, laptop or notebook computer, tablet computer, pocket computer, telephone, smart phone, network switches or routers, or any other appropriate type of electronic device.

It is noted that FIG. 3 is intended to depict the representative major components of an exemplary computer system 301. In some embodiments, however, individual components may have greater or lesser complexity than as represented in FIG. 3, components other than or in addition to those shown in FIG. 3 may be present, and the number, type, and configuration of such components may vary.

One or more programs/utilities 328, each having at least one set of program modules 330 may be stored in memory 304. The programs/utilities 328 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 328 and/or program modules 330 generally perform the functions or methodologies of various embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for preventing eavesdropping by a device, comprising:
    installing an anti-eavesdrop component on the device;
    in response to installing the anti-eavesdrop component, recognizing by the device the anti-eavesdrop component as a primary audio input for the device;
    blocking from the device outside audio by the anti-eavesdrop component by inputting an audio signal into the primary input of the device, where the audio signal is selected from the group consisting of white noise and random words; and
    alerting a user when a secondary audio input on the device is active.

2. The method of claim 1 wherein the audio signal is input at a magnitude that audio captured by a second audio input on the device cannot discern outside audio.

3. The method of claim 1 further comprising:
    deactivating the anti-eavesdrop component;
    communicating by a user audibly with the device; and
    reactivating the blocking of the anti-eavesdrop component in response to completion of the communication by the user.

4. The method of claim 3 wherein deactivating is performed in response to an audio command from the user recognized by the anti-eavesdrop component.

5. The method of claim 3 wherein reactivating occurs after a predetermined period of time following completion of the communication by the user.

6. The method of claim 1 wherein blocking turns off all other audio inputs present on the device.

7. The method of claim 1 wherein installing further comprises:
    causing a short between a microphone pin and a ground pin of an audio input jack of the device.

8. A system for preventing eavesdropping comprising:
a device, the device configured to capture audio from an environment through at least one audio input; and
an anti-eavesdrop component connected to the device, the anti-eavesdrop component configured to actively prevent the device from capturing audio from the environment by causing a short between a microphone pin and a ground pin of an audio input jack of the device.

9. The system of claim 8 wherein the anti-eavesdrop device injects an audio signal into the at least one audio input.

10. The system of claim 9 wherein the audio signal is white noise.

11. The system of claim 9 wherein the audio signal is random words.

12. The system of claim 9 wherein the audio signal is not audible to a user of the device.

13. The system of claim 8 wherein the anti-eavesdrop component is integrated into a second device that a user uses with the device.

14. The system of claim 13 wherein the second device is a mobile phone case.

15. The system of claim 13 wherein the second device is a headphone.

16. The system of claim 8 wherein the anti-eavesdrop component is configured to provide a notification to a user that a second audio input on the device is active.

17. A system for preventing eavesdropping comprising:
a device, the device configured to capture audio from an environment through at least one audio input; and
an anti-eavesdrop component connected to the device, the anti-eavesdrop component configured to actively prevent the device from capturing audio from the environment, wherein the anti-eavesdrop component is configured to provide a notification to a user that a second audio input on the device is active.

* * * * *